United States Patent
Friedmann et al.

(10) Patent No.: US 10,146,824 B2
(45) Date of Patent: Dec. 4, 2018

(54) DATABASE JOB DESCRIPTION AND SCHEDULING

(71) Applicants: Bjoern Friedmann, Rheinmunster (DE); Florian Foebel, Burstadt (DE); Boris Gruschko, Heidelberg (DE); Christian Mohr, Heidelberg (DE); Martin Strenge, Berlin (DE); Sascha Zorn, Schwetzingen (DE)

(72) Inventors: Bjoern Friedmann, Rheinmunster (DE); Florian Foebel, Burstadt (DE); Boris Gruschko, Heidelberg (DE); Christian Mohr, Heidelberg (DE); Martin Strenge, Berlin (DE); Sascha Zorn, Schwetzingen (DE)

(73) Assignee: SAP SE, Walldorf (DE)

( * ) Notice: Subject to any disclaimer, the term of this patent is extended or adjusted under 35 U.S.C. 154(b) by 531 days.

(21) Appl. No.: 14/310,698

(22) Filed: Jun. 20, 2014

(65) Prior Publication Data

US 2015/0149425 A1    May 28, 2015

Related U.S. Application Data

(60) Provisional application No. 61/908,710, filed on Nov. 25, 2013.

(51) Int. Cl.
| | |
|---|---|
| *G06F 17/30* | (2006.01) |
| *H04L 12/26* | (2006.01) |
| *G06F 11/36* | (2006.01) |
| *H04L 29/06* | (2006.01) |
| *H04L 29/08* | (2006.01) |
| *G06F 21/62* | (2013.01) |

(52) U.S. Cl.
CPC .... *G06F 17/30371* (2013.01); *G06F 11/3668* (2013.01); *G06F 17/30289* (2013.01); *G06F 17/30303* (2013.01); *G06F 17/30864* (2013.01); *H04L 43/10* (2013.01); *H04L 63/083* (2013.01); *H04L 67/02* (2013.01); *G06F 21/6218* (2013.01); *H04L 63/08* (2013.01)

(58) Field of Classification Search
CPC .................................. G06F 17/30371
See application file for complete search history.

(56) References Cited

U.S. PATENT DOCUMENTS

| | | | | |
|---|---|---|---|---|
| 2004/0054695 | A1* | 3/2004 | Hind | G06F 11/3636 |
| 2009/0276447 | A1* | 11/2009 | McCormack | G06F 17/30575 |
| 2009/0292790 | A1* | 11/2009 | Salonikios | G06F 17/30067 709/217 |
| 2011/0055147 | A1* | 3/2011 | Joerg | G06F 9/4843 707/602 |
| 2011/0106951 | A1* | 5/2011 | Akiyama | G06F 9/5055 709/226 |
| 2012/0136902 | A1* | 5/2012 | Oyarzabal | G06F 17/30017 707/802 |
| 2014/0201747 | A1* | 7/2014 | Pattnaik | G06F 11/3006 718/101 |

* cited by examiner

*Primary Examiner* — Kris E Mackes
(74) *Attorney, Agent, or Firm* — Buckley, Maschoff & Talwalkar LLC (57) ABSTRACT

A system includes acquisition of executable code of a database job, generation of a definition of the database job in a database repository, the definition of the database job comprising metadata specifying the executable code of the database job and a schedule for executing the executable code, association of a user with the database job, and activation of the database job.

20 Claims, 6 Drawing Sheets

DATABASE JOB DESCRIPTION AND SCHEDULING

CROSS REFERENCE TO RELATED APPLICATIONS

This application claims benefit to and priority of U.S. Patent Application Ser. No. 61/908,710, filed Nov. 25, 2013, the contents of which are hereby incorporated by reference in their entirety for all purposes.

BACKGROUND

According to conventional database architectures, a client application requests information from an application executing on an application server. The application server requests appropriate data from a database system, receives the data from the database system, provides any required additional processing, and provides the requested information to the client application.

Database systems may also execute various background jobs in addition to the foregoing. These jobs may include indexing, cache maintenance, pre-processing of data, etc. Execution of a background job may be triggered by a condition (e.g., cache usage greater than a threshold) and/or a schedule. Conventional database job scheduling systems and syntax (e.g., Unix cron) do not provide a desired level of scheduling control and specificity.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
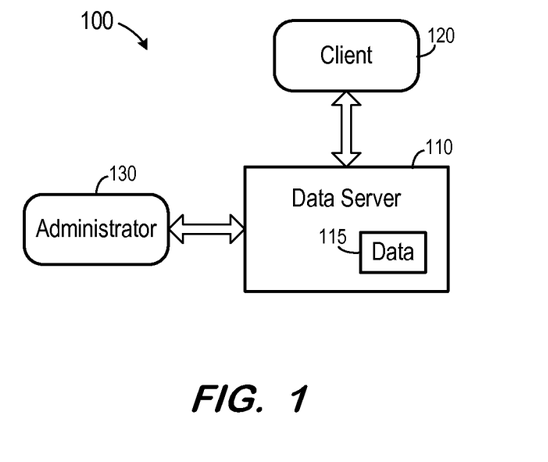
FIG. 1 is a block diagram of a system according to some embodiments.

FIG. 1 is a block diagram of system 100 according to some embodiments. System 100 includes data server 110, client 120 and administrator 130. Generally, data server 110 receives queries from client 120 and provides results to client 120 based on data of data 115. Data server 110 may support multi-tenancy to separately support multiple unrelated clients by providing multiple logical database systems which are programmatically isolated from one another.

Data server 110 implements an "in-memory" database, in which data 115 is a full database stored in volatile (e.g., non-disk-based) memory (e.g., Random Access Memory). The full database may be persisted in and/or backed up to fixed disks (not shown). Embodiments are not limited to an in-memory implementation. For example, data 115 may be stored in Random Access Memory (e.g., cache memory for storing recently-used data) and one or more fixed disks (e.g., persistent memory for storing their respective portions of the full database).

Data server 110 may comprise any query-responsive data source or sources that are or become known, including but not limited to a structured-query language (SQL) relational database management system. Data server 110 may comprise a relational database, a multi-dimensional database, an eXtendable Markup Language (XML) document, or any other data storage system storing structured and/or unstructured data. Data 115 may be distributed among several relational databases, dimensional databases, and/or other data sources. Embodiments are not limited to any number or types of data sources.

In some embodiments, data 115 may comprise one or more of conventional tabular data, row-based data, column-based data, and object-based data. Moreover, the data of data source 110 may be indexed and/or selectively replicated in an index to allow fast searching and retrieval thereof.

Client 120 may comprise one or more devices executing program code of a software application for presenting user interfaces to allow interaction with data server 110. For example, a user may manipulate such user interfaces to request particular data (e.g., for populating a spreadsheet, a graph, etc.). In response, client 120 executes program code of a software application to generate a query (e.g., a structured-query language (SQL) query) identifying the requested data, and to transmit the query to data server 110.

Presentation of a user interface may comprise any degree or type of rendering. For example, client 120 may execute a Web Browser to receive a Web page (e.g., in HTML format) from data server 110, and may render and present the Web page according to known protocols. Client 120 may also or alternatively present user interfaces by executing a standalone executable file (e.g., an .exe file) or code (e.g., a JAVA applet) within a virtual machine. System 100 may include any number of clients 120 of one or more types according to some embodiments.

Similar to client 120, administrator 130 may comprise one or more devices executing program code of a software application for presenting user interfaces to allow interaction with data server 110. Administrator 130 may be operated to administer data server 110. Such administration may include scheduling background jobs as described herein.

Figure 2:
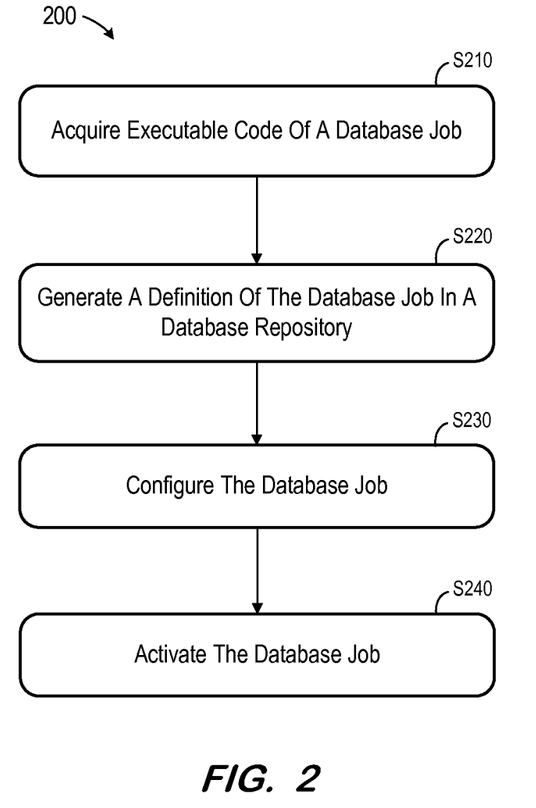
FIG. 2 is a flow diagram of a process according to some embodiments.

FIG. 2 comprises a flow diagram of process 200 according to some embodiments. In some embodiments, various hardware elements of data server 110 (e.g., one or more processors) execute program code to perform process 200. Process 200 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, executable code of a database job is acquired. The acquired executable code may be stored in a repository of data server 110. For purposes of the present description, a database job is a task different from the above-described client request/response processing.

In some embodiments, the executable code of a database job may comprise a JavaScript function or a SQLScript procedure. Accordingly, S210 may comprise operating administrator 130 to deploy a .xsjs file which includes a Javascript function.
Example:

```
sap.hana.xs.jobtest:code.xsjs
function firstJobFunction( ) {
// do something
}
```

The JavaScript function does not return a value in some embodiments. Code in the global scope will be executed before the JavaScript function is called. For error handling, an exception may be thrown whose string value is written to a job log.

In the case of a SQLScript procedure, the executable code may comprise any SQLScript procedure that can be called without parameters. As mentioned above, returned values may be ignored, and SQL errors may be written to the job log.

Next, at S220, a definition of the database job is generated in the database repository. The definition may comprise metadata including a description, a reference to the application code to be executed (i.e., the executable code of S210), a scheduling definition, and parameters to be passed to the executed action/code. The definition is generated as a repository object.

Figure 3:
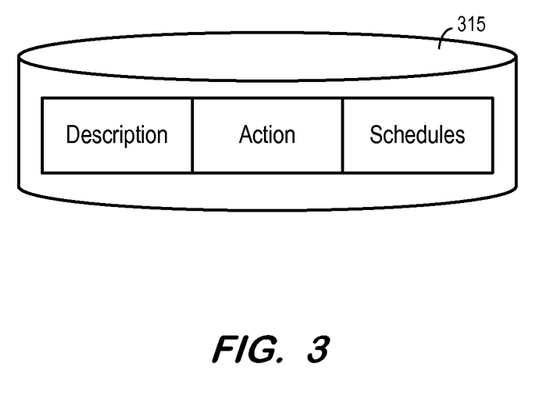
FIG. 3 depicts a database table according to some embodiments.

FIG. 3 depicts an example of a repository table according to some embodiments. Job definition table 315 specifies, for each job definition stored therein, a description of the job (e.g., a name), an action (e.g., a reference to executable code) and definitions of one or more schedules. According to some embodiments, administrator 130 may add one or more schedules to an existing job definition at runtime, using a JavaScript API.

The job definition may be generated using a .xsjob file expressed in JavaScript Object Notation (JSON). For example:

```
sap.hana.xs.jobtest:first (package "sap.hana.xs.jobtest", file "first.xsjob")
{
"description": "My first job",
"action": "sap.hana.xs.jobtest:code.xsjs::firstJobFunction",
"schedules": [
{ "description": "Will run every minute", "xscron": "* * * * * * 0" }
]
}
```

According to some embodiments, a schedule definition is expressed using the following syntax: "'Year' 'Month' 'Day' 'Day of Week' 'Hour' 'Minute' 'Second'"
Parameter Constraints:

| Year | 4-digit |
| Month | 1 bis 12 |
| Day | −31 bis 31 |
| DayOfWeek | mon, tue, wed, thu, fri, sat, sun |
| Hour | 0 bis 23 |
| Minute | 0 bis 59 |
| Second | 0 bis 59 |

Expressions:

| * | Alle | Any value |
| */a | Alle | Any a - the value |
| a:b | Alle | Values in range a to b |
| a:b/c | Alle | Every c - the value between a and b |
| a·y | DayOfWeek | On the a - the occurrence of the weekday y (−5 < a < 5) |
| a, b, c | Alle | A or b or c |

Examples

| 2013 * * fri 12 0 0 | Every Friday in 2013 at 12:00 h |
| * * 3:−2 * 12:14 0 0 | Every hour between 12:00 h and 14:00 h on every day of the month between the third day and the second-to-last day |
| * * * −1.sun 9 0 0 | Every last Sunday of a month at 9:00 h |

In contrast to conventional scheduling definition syntax, some embodiments provide scheduling relative to and in advance of specific time periods. More specifically, the syntax allows a schedule to specify a time period based on its temporal relation to a last day of a month. In this regard, the expressions "3:−2" and "−1.sun" of the above examples specify the third day of the month to the second-to-last day of the month, and the last Sunday of the month, respectively. Among other benefits, the syntax reduces a need to generate one schedule for months having 30 days, a second schedule for months having 31 days, and a third (and possibly a fourth) schedule for February.

The job definition may be generated at S220 using a job definition language. For example, a developer may use such a job definition language to generate a design-time representation of a job and to store the representation as an object in the repository. Such a representation includes descriptive metadata, a reference to action to be triggered, predefined scheduling definition (optional), and predefined parameters (optional). A database job definition can therefore be shipped as part of an application, or after activation of the object (i.e., after a runtime object has been derived from the design-time object).

The database job is configured at S230. According to some embodiments of S230, an administrator specifies a user account and locale to be used for executing the job. Administrator 130 may support a web-based administration tool to specify the user account and locale, and/or the job may be configured programmatically (e.g., via a server-side script API). S230 may also comprise defining a start timestamp and an end timestamp to restrict the job to a given timeframe.

The database job is activated at S240, for example via the above-mentioned web-based administration tool or programmatically. Activation at S240 may consist of marking the job as active using a checkbox of a user interface displaying the job details.

In operation, the database uses the job definitions of the database repository to automatically trigger the execution of all active jobs according to their respective defined schedules. Related parameters are passed to the executed logic/action, and results/status information about each execution are persistently saved.

Figure 4:
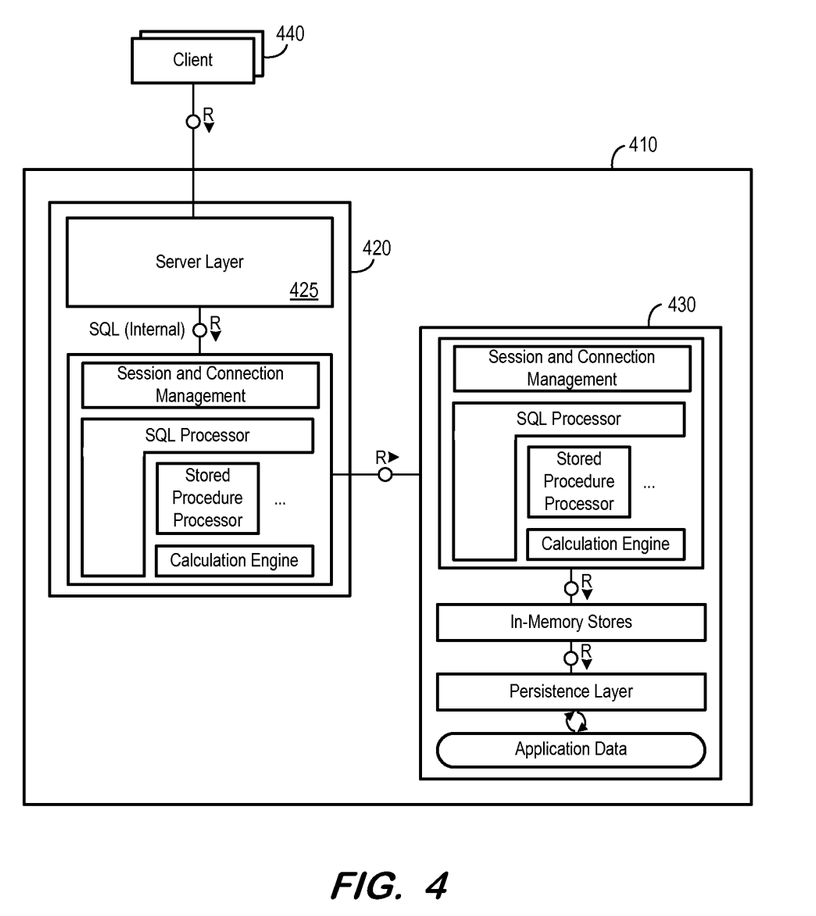
FIG. 4 is a block diagram of a system according to some embodiments.

FIG. 4 illustrates database platform 410 integrating web application server 420 and index server 430 according to some embodiments. Web application server 420 may enable execution of server applications completely on database platform 410, without the need for an additional application server. Database platform 410 may comprise an implementation of data server 110 of FIG. 1.

Clients 440 send their requests to database platform 410 via HTTP or HTTPS. Clients 440 may be Web browsers, mobile applications, or other applications that consume resources and services provided by server applications. According to some embodiments, the presentation logic is run on clients 440.

Server 420 runs services that accept the HTTP requests and maps them to database queries and stored procedure calls. Data-intensive logic may be executed in index server 430 (using SQL, SQLScript, views, L procedures, C++, etc.).

In this regard, web application server 420 can be viewed as an index server with server layer 425 on top. However, according to some embodiments, no application data is stored in Web application server 420 itself. If server layer 425 needs to access tables or views or needs to call a stored procedure, it uses the illustrated internal SQL API to open a local database connection and then sends an SQL statement to the SQL processor in the web application server 420. The statement is processed by the SQL processor or by the calculation engine of web application server 410.

The SQL processor and the calculation engine delegate the execution to the index server 430 which manages the required data. This delegation may be similar to the mechanism used in a distributed database system including multiple index servers. In contrast, however, web application server 420 delegates the execution of database operations because it does not store application tables. Integration of server 420 into database platform 410 may lead to simplified administration and a better development experience.

Figure 5:
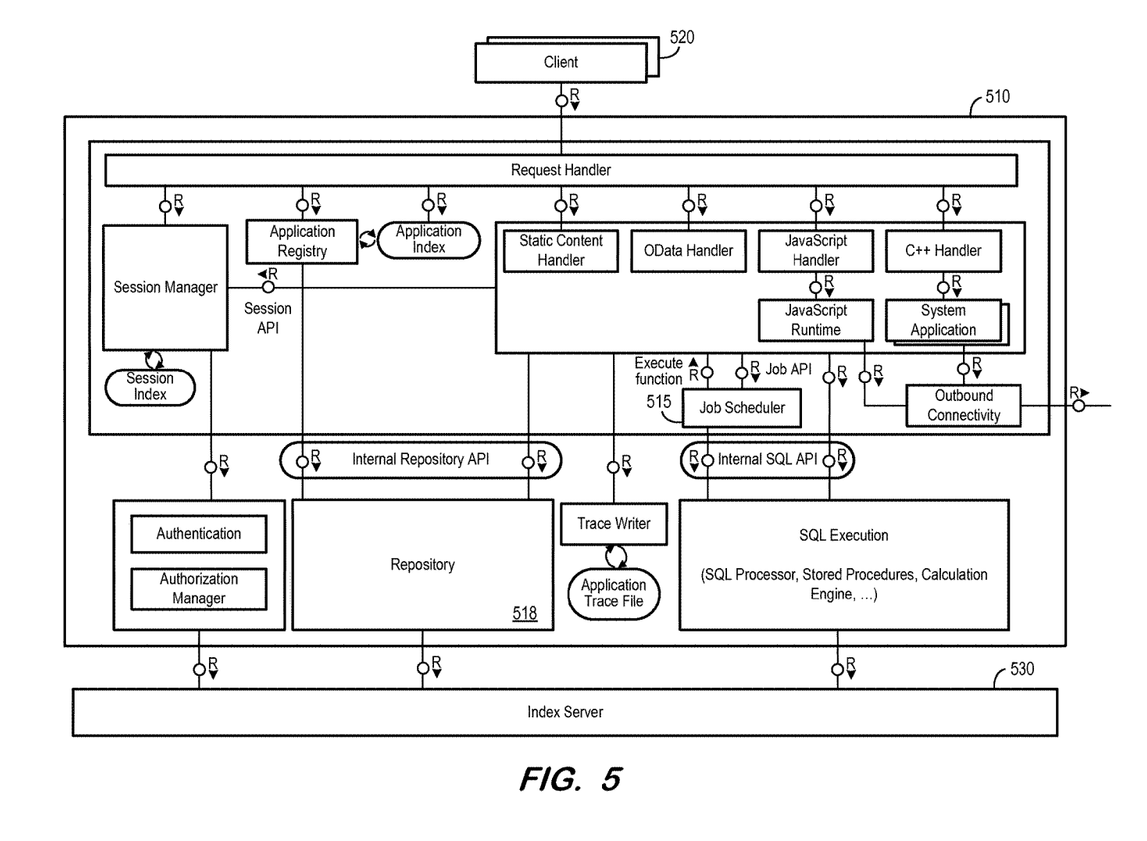
FIG. 5 is a block diagram of a system according to some embodiments.

FIG. 5 is a detailed block diagram of Web application server 510 according to some embodiments. Server 510 may comprise an implementation of server 420 of FIG. 4. Incoming requests from clients 520 are received by the request handler. The request handler first determines the application to which the requested resource belongs by invoking the application registry, which maintains a list of all active applications. The application registry initially reads this information from runtime storage tables located in the master index server and caches the information in its application index. After the application is determined, optional Uniform Resource Locator (URL) rewriting rules are applied. URL rewriting rules can be defined for each application to map between external URLs and corresponding internal technical URLs.

The request handler then invokes the session manager. The session manager either relates the request to an existing session or starts a new session. The session manager is responsible for session authentication. A developer may specify, on the package level, whether authentication is required for accessing the resources. Server 510 may support several authentication mechanisms, including but not limited to SAML, SAP assertion ticket, SAP logon ticket, Kerberos, X.509 certificates, and user and password using HTTP basic authentication or form-based logon.

After successful authentication, the request handler forwards the request to the responsible resource handler of server 510. FIG. 5 illustrates several different resource handlers for different types of resources.

The static content handler is called for content such as Hypertext Markup Language (HTML) files, client side scripts, or images. The static content handler retrieves the resources from the runtime storage.

The OData handler is invoked if the requested resource belongs to an OData service. If the client requests the service definition, the OData handler returns a document including the metadata about the service. This document is generated during the activation of the service descriptor which was written by the developer. If the client requests actual data, the OData handler constructs the required database statements and invokes them using the internal SQL API. The OData handler transforms the query results into the format requested by the client, which can be either Atom (content type "atom+XML") or JSON. As explained above, developers can specify application specific code to be called for validating or executing OData write requests. In this case the OData handler calls the specified code, which may be SQLScript procedures or JavaScript functions.

The JavaScript handler is invoked if the requested resource is a server-side JavaScript program. The JavaScript handler reads the runtime object with the JavaScript byte code from the runtime storage tables, and invokes the JavaScript runtime for executing it. The JavaScript runtime also contains an implementation of JavaScript APIs. If such an API is called, the JavaScript runtime invokes the responsible component, such as the session manager, the outbound HTTP client, the trace writer, or the internal SQL API.

The outbound HTTP client is used to send HTTP/S requests to an external server. The connection details of the remote server need to be specified in advance by creating an HTTP destination configuration. The internal SQL API invokes an SQL execution chain. The SQL executor and the calculation engine in server 510 delegate the actual data operations to the index server where the data resides.

The C++ handler is responsible for resources and services exposed by system applications that are written in C++. These system applications have the same lifecycle as the database platform and are part of the database build. One example is a Direct Extractor Connection (DXC) that allows DataSource extractor-based data replication between clients and the database platform via HTTP. DataSource extractors in the client are redirected to send extracted data to the database platform system via HTTP. The data is received by the DXC system application in the XS server, which stores it in the database.

Job scheduler 515 provides execution of jobs according to job definitions stored in repository 518 and described above. Also stored in repository 518 are SQLScript code and JavaScript programs associated with the scheduled jobs. These JavaScript programs are identified by a special file extension (e.g., .xsjs) to distinguish them from client-side JavaScript. When a scheduled job is activated, its associated executable code (e.g., SQLScript or JavaScript) is compiled into byte code and stored in repository 518 as runtime objects.

Figure 6:
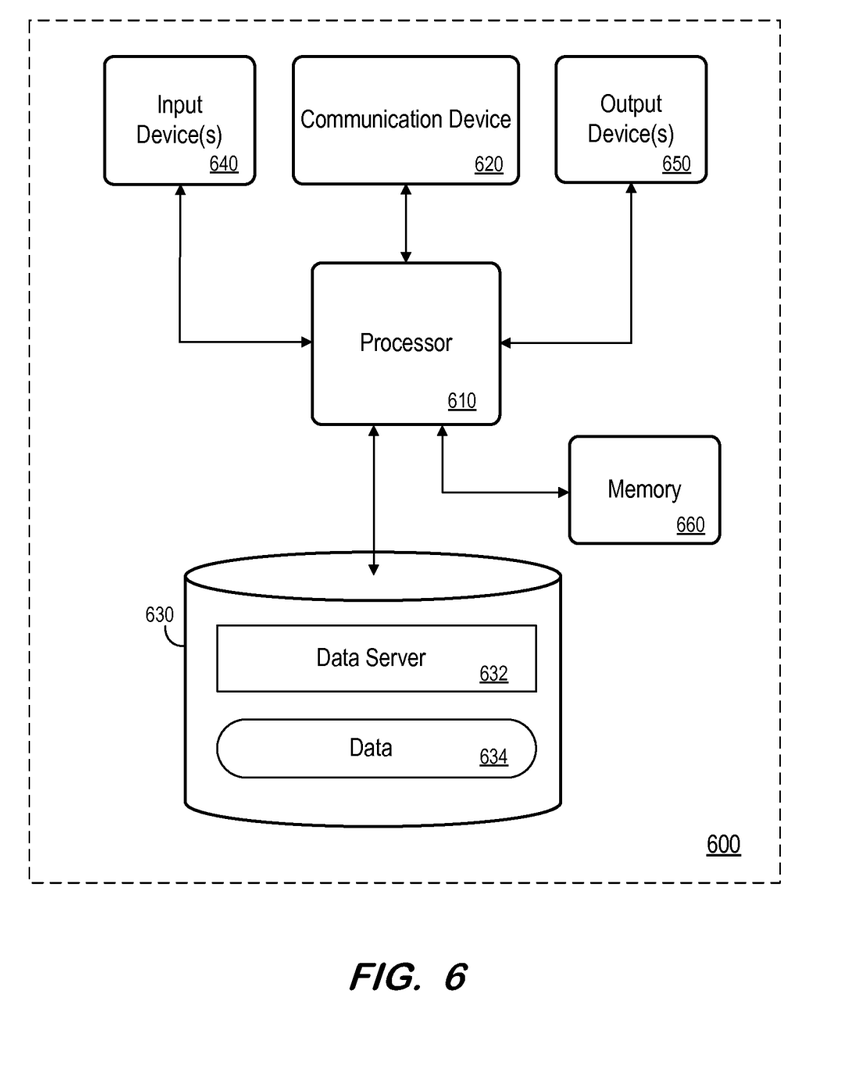
FIG. 6 is a block diagram of an apparatus according to some embodiments.

FIG. 6 is a block diagram of apparatus 600 according to some embodiments. Apparatus 600 may comprise a general-purpose computing device and may execute program code to perform any of the functions described herein. Apparatus 600 may comprise an implementation of database server 110 of FIG. 1 in some embodiments. Apparatus 600 may include other unshown elements according to some embodiments.

Apparatus 600 includes processor 610 operatively coupled to communication device 620, data storage device 630, one or more input devices 640, one or more output devices 650 and memory 660. Communication device 620 may facilitate communication with external devices, such as a reporting client, or a data storage device. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into apparatus 600. Output device(s) 650 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM).

Data server 632 may comprise program code executed by processor 610 to cause apparatus 600 to perform any one or more of the processes described herein. Embodiments are not limited to execution of these processes by a single apparatus. Data 634 may include database data and repository objects as described above. As also described above, such database data (either cached or a full database) and/or repository objects may be stored in volatile memory such as memory 660. Data storage device 630 may also store data and other program code for providing additional functionality and/or which are necessary for operation of apparatus 600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
    a memory storing:
        a database; and
        a database repository; and
    a processor to execute the processor-executable process steps to cause the system to:
    acquire executable code of a database job, wherein the database job is a task different from client request/response processing, and wherein the executable code of the database job comprises a JavaScript function or a SQL-Script procedure identified by a file extension distinguishable from client-side JavaScript function executable code or client-side SQL-Script procedure executable code, and wherein a JavaScript handler reads a runtime object with JavaScript byte code, and invokes the JavaScript runtime for executing the JavaScript function executable code when the executable code of the database job comprises the JavaScript function executable code;
    generate a definition of the database job as a repository object in the database repository, the definition of the database job comprising: (1) metadata specifying the executable code of the database job; and (2) a schedule for executing the executable code relative to, and in advance of, a specific time period, wherein the schedule was predetermined during a design time of an application;
    associate a user with the database job; and
    activate the database job.

2. A system according to claim 1, wherein the metadata specifies the schedule based on a temporal relation to a last day of a month.

3. A system according to claim 2, wherein the processor is further to execute the processor-executable process steps to cause the system to:
    associate a start timestamp and an end timestamp with the database job.

4. A system according to claim 2, wherein activation of the database job comprises compilation of executable code associated with the database job into byte code and storing the byte code in the database repository as a runtime object.

5. A system according to claim 2, wherein the metadata specifies a second schedule for executing the executable code.

6. A system according to claim 1, further comprising:
    associating a start timestamp and an end timestamp with the database job.

7. A system according to claim 1, wherein activation of the database job comprises compilation of executable code associated with the database job into byte code and storing the byte code in the database repository as a runtime object.

8. A computer-implemented method comprising:
    acquiring executable code of a database job, wherein the database job is a task different from client request/response processing, and wherein the executable code of the database job comprises a JavaScript function or a SQL-Script procedure identified by a file extension distinguishable from client-side JavaScript function executable code or client-side SQL-Script procedure executable code, and wherein a JavaScript handler reads a runtime object with JavaScript byte code, and invokes the JavaScript runtime for executing the JavaScript function executable code when the executable code of the database job comprises the JavaScript function executable code;
    generating a definition of the database job as a repository object in a database repository, the definition of the database job comprising: (1) metadata specifying the executable code of the database job; and (2) a schedule for executing the executable code relative to, and in advance of, a specific time period, wherein the schedule is predetermined during a design time of an application;
    associating a user with the database job; and
    activating the database job.

9. A computer-implemented method according to claim 8, wherein the metadata specifies the schedule based on a temporal relation to a last day of a month.

10. A computer-implemented method according to claim 9, further comprising:
    associating a start timestamp and an end timestamp with the database job.

11. A computer-implemented method according to claim 9, wherein activating the database job comprises compiling executable code associated with the database job into byte code and storing the byte code in the database repository as a runtime object.

12. A computer-implemented method according to claim 8, wherein the metadata specifies a second schedule for executing the executable code.

13. A computer-implemented method according to claim 8, further comprising: associating a start timestamp and an end timestamp with the database job.

14. A computer-implemented method according to claim 8, wherein activating the database job comprises compiling executable code associated with the database job into byte code and storing the byte code in the database repository as a runtime object.

15. A non-transitory computer-readable medium storing program code, the program code executable by a computer system to cause to the computer system to:
  acquire executable code of a database job, wherein the database job is a task different from client request/response processing, and wherein the executable code of the database job comprises a JavaScript function or a SQL-Script procedure identified by a file extension distinguishable from client-side JavaScript function executable code or client-side SQL-Script procedure executable code, and wherein a JavaScript handler reads a runtime object with JavaScript bye code, and invokes the JavaScript runtime for executing the JavaScript function executable code when the executable code of the database job comprises the JavaScript function executable code;
  generate a definition of the database job as a repository object in a database repository, the definition of the database job comprising: (1) metadata specifying the executable code of the database job; and (2) a schedule for executing the executable code relative to, and in advance of, a specific time period, wherein the schedule is predetermined during a design time of an application;
  associate a user with the database job; and
  activate the database job.

16. A non-transitory computer-readable medium according to claim 15, wherein the metadata specifies the schedule based on a temporal relation to a last day of a month.

17. A non-transitory computer-readable medium according to claim 16, the program code executable by the computer system to cause to the computer system to:
  associate a start timestamp and an end timestamp with the database job.

18. A non-transitory computer-readable medium according to claim 16, wherein activation of the database job comprises compilation of executable code associated with the database job into byte code and storing the byte code in the database repository as a runtime object.

19. A non-transitory computer-readable medium according to claim 15, wherein the metadata specifies a second schedule for executing the executable code.

20. A non-transitory computer-readable medium according to claim 15, wherein activation of the database job comprises compilation of executable code associated with the database job into byte code and storing the byte code in the database repository as a runtime object.

* * * * *